United States Patent
Lanning (10) Patent No.: US 8,230,285 B2
(45) Date of Patent: *Jul. 24, 2012

(54) PROTOCOL ANALYZER FOR CONSUMER ELECTRONICS

(75) Inventor: Eric J. Lanning, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1550 days.

This patent is subject to a terminal disclaimer.

(21) Appl. No.: 11/552,122

(22) Filed: Oct. 23, 2006

(65) Prior Publication Data

US 2007/0226571 A1    Sep. 27, 2007

Related U.S. Application Data

(60) Provisional application No. 60/774,686, filed on Feb. 17, 2006.

(51) Int. Cl.
*G01R 31/28* (2006.01)
*G01R 27/28* (2006.01)
*G01R 31/00* (2006.01)
*G01R 31/14* (2006.01)
*G06F 11/22* (2006.01)
*G06F 17/50* (2006.01)

(52) U.S. Cl. ......... 714/734; 714/724; 702/117; 716/136

(58) Field of Classification Search .................. None
See application file for complete search history.

(56) References Cited

U.S. PATENT DOCUMENTS

| | | | | |
|---|---|---|---|---|
| 5,260,970 A | * | 11/1993 | Henry et al. | 375/224 |
| 5,375,224 A | * | 12/1994 | Larsen et al. | 710/33 |
| 5,717,870 A | * | 2/1998 | Dobson | 709/250 |
| 5,787,253 A | * | 7/1998 | McCreery et al. | 709/231 |
| 2003/0229827 A1 | * | 12/2003 | Dun et al. | 714/48 |
| 2004/0066216 A1 | * | 4/2004 | Spehar | 327/65 |
| 2004/0158793 A1 | * | 8/2004 | Blightman et al. | 714/758 |
| 2005/0040233 A1 | * | 2/2005 | Korber et al. | 235/440 |

* cited by examiner

*Primary Examiner* — Guerrier Merant
(74) *Attorney, Agent, or Firm* — Volentine & Whitt, PLLC (57) ABSTRACT

A protocol analyzer for analyzing traffic on a bus. A tap card is used to tap into a bidirectional bus. The tap provides a pass through connection from the card to the host and taps off of the bus. While tapping off the bus, stubs lengths are minimized and input capacitance is minimized. A repeater that preferably has no internal termination provides a differential input and a differential output. The bus lines are input to one of the inputs in the differential inputs and a reference voltage is provided to the other differential input. The reference voltage enables the tap to determine if the data is high or low. A jumper is also included in the tap such that the reference voltage can be selected from the host or from the pod.

23 Claims, 4 Drawing Sheets

PROTOCOL ANALYZER FOR CONSUMER ELECTRONICS

CROSS REFERENCE TO RELATED APPLICATIONS

This application claims the benefit of U.S. Provisional Patent Application Ser. No. 60/774,686, filed Feb. 17, 2006 and entitled PROTOCOL ANALYZER FOR CONSUMER ELECTRONICS, which application is incorporated by reference in its entirety.

BACKGROUND OF THE INVENTION

1. The Field of the Invention

The present invention relates to analyzing signals between a host and a device by tapping the bus. More particularly, embodiments of the invention relate to a tap for tapping a bus between a host and a device.

2. The Relevant Technology

Protocol analyzers are devices that detect, diagnose, and solve problems that occur on networks or over busses used by hosts and attached devices. Typically, protocol analyzers view traffic on the network, over a bus or over a connection as the traffic occurs. This enables the traffic to be monitored in real time in some instances. As the data or traffic is being monitored, the protocol analyzer may detect a problem or a defined condition. At this point, the analyzer triggers and captures the data present on the network or on the bus. The amount of data captured can depend on the size of the analyzer's buffer. The analyzer can also be configured such that the captured data represents data that occurred before the triggering event, after the triggering event, and/or both before and after the triggering event. In addition, data can also be captured without a triggering event. Rather, data can simply be captured until the buffer is full. In effect, the capture is a snapshot of the data that was present on the network or bus around the time that a problem occurred or a condition was detected or when a capture was initiated. The captured data can then be analyzed to help resolve many problems and improve communications in a network or between a host and a device.

Some protocols, however, are difficult to implement in analyzers. SD (Secure Digital Cards), SDIO (SD Input/Output Cards, MMC (Multimedia Cards) and CE-ATA (Consumer Electronics-Advanced Technology Attachment) are examples of protocols that are difficult to analyze in conventional systems. Some of the reasons are related to the physical sizes of devices that use SD, SDIO, MMC or CE-ATA. Other reasons are related to the cost. CE-ATA connectors, for example, have a limited number of insertion cycles. Because protocol analyzers are repeatedly connected and disconnected, cost can become a significant issue when analyzing CE-ATA.

In addition, many consumer devices do not operate at the same voltage levels. This can complicate the issue of connecting a system to a protocol analyzer when the voltage levels are not known beforehand because the analyzer may not be able to distinguish between low and high signals. Further, when the bus is electrical in nature rather than optical, there are also issues related to impedance matching and capacitive loading.

BRIEF SUMMARY OF THE INVENTION

These and other problems are overcome by embodiments of the invention, which relate to a protocol analyzer and more particularly to a protocol analyzer for use in consumer devices. A protocol analyzer, according to one embodiment of the invention, includes a protocol analyzer, a detachable pod, and a tap or tap board. One of the advantages of separating the tap from the pod is that taps with a low number of insertion cycles can be replaced in a relatively inexpensive manner.

The protocol analyzer can perform protocol analysis on any data received from a system under test. In this example, the pod and the tap can be used not only to provide the data on the bus of the system under test to the protocol analyzer, but also perform some processing on the data. The tap typically has a tap ID that can be provided to the pod and/or the protocol analyzer. The tap ID enables the type of tap to be known. For example, a protocol analyzer or pod may know that the tap has a form factor for CE-ATA, SD, SDIO or MMC type protocols and that the data tapped by the tap conforms to the corresponding protocol. The pod also provides a pod ID that can be used like the tap ID. In one embodiment, the protocol analyzer can program the pod based on the pod ID or the tap ID.

The tap provides a pass through bus in one embodiment and includes repeaters that are connected to the various bus lines. The data from the repeaters is provided to the pod, which is able to define the data using a bitfile that is selected according to the tap ID. The pod then provides the data to the protocol analyzer for protocol analysis.

The tap includes repeaters with differential inputs for the bus lines. One of the inputs is from the bus and the other input is from a circuit that generates a reference voltage. This enables the signals on the bus to be distinguished as ones or zeros without needing to know the operating voltage (Vcc) of the system under test. Also, the output signal of the repeater can be more reliably transmitted over longer distances. Because the circuit generating the reference voltage draws current from the host supply voltage, this could cause the device under test to not function properly. In this case, the tap may include the ability to use a reference operating voltage from the pod rather that exceed any current limitations of the system under test when using the operating voltage of the system under test.

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

Embodiments of the invention overcome the limitations of conventional systems and relate to systems and methods for performing protocol analysis. More particularly, embodiments of the invention relate to a tap board that can be used to tap the busses of systems that support protocols including, but not limited to, SD, SDIO, MMC and CE-ATA protocols or any combination thereof. Embodiments of the invention further relate to systems and methods for configuring a protocol analyzer based on tap and/or pod type. As used herein, a bus can include data lines, command lines, a clock, voltages provided by a host to a device, ground, and the like or any combination thereof. Embodiments of the invention can tap some or all of the lines that are included in any given bus.

A protocol analyzer in accordance with embodiments of the invention includes an analyzer, a pod and a tap board or tap. When using the protocol analyzer, the tap is typically connected to a system under test in a manner than enables the tap to provide the signals on the system's bus to a pod. To deliver the tapped signals, the tap connects or interfaces with the pod. The pod, in turn, interfaces with the analyzer. Through these connections, the signals present on the bus can be delivered to the analyzer. The pod can also perform some functions prior to delivering the tapped signals to the protocol analyzer.

As discussed in more detail below, the pod typically includes an FPGA, microprocessor, application specific integrated circuit (asic) or network processor that processes the signals from the bus of the system being analyzed. The FPGA, processor or asic can be pre-programmed with the logic needed for a given tap or programmed for a given tap once the type of tap is determined. Thus a pod may be able to interface with multiple taps and thus with multiple protocols, without knowing beforehand which tap or protocol is being used. The pod may also include control status indicators such as LEDs. In one embodiment, the tap and the pod are separate devices and are connected using a cable. This enables a relatively inexpensive tap to be manufactured and which can be replaced as necessary, especially when used with form factors whose connectors have a low number of insertion cycles. As previously indicated, some connectors have a relatively low insertion cycle count and requiring replacement of the pod is more costly than replacing a tap.

The pod can connect to the tap board in at least two different ways. The tap board or tap can connect directly to a pod with the connector or through a cable. To insure signal integrity, the LVDS (Low Voltage Differential Signaling) signaling may be used. Embodiments of the invention incorporate LVDS signaling in the tap to determine whether signals on the bus are high or low as described below. In some instances, voltage levels may be translated to comply with various signaling requirements of the tap, the pod, and/or the analyzer. For example, LVTTL signals in the FPGA may be converted to LVDS signals.

A bus typically uses electrical signals, although optical signals are within the scope of the invention, and embodiments of the invention encompass both differential signaling and/or single ended signaling. Some of the differential inputs/outputs described herein can also be implemented as single ended inputs/outputs.

Figure 1:
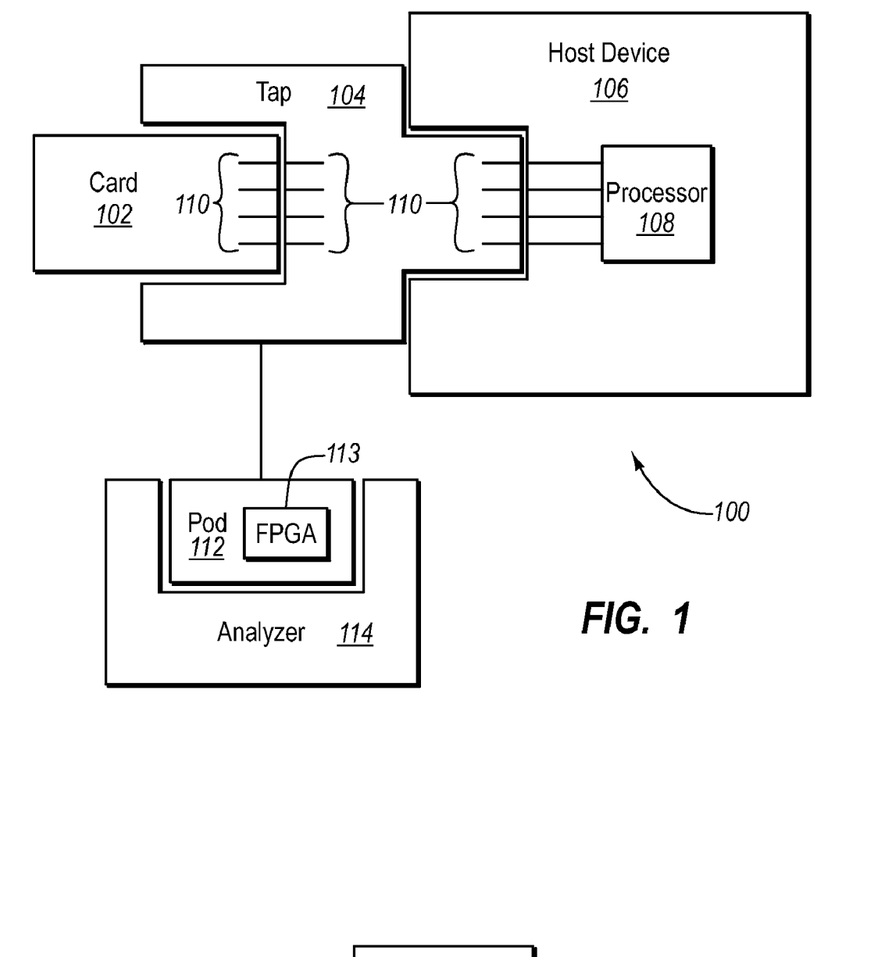
FIG. 1 illustrates an exemplary environment for implementing embodiments of the invention.

FIG. 1 illustrates an exemplary environment for implementing embodiments of the invention. FIG. 1 illustrates a system 100 that includes a host 106 that connects with a card 102. The host 106 and the card 102 represent the system under test. The card 102 represents various media cards that include, but are not limited to, MMC (Multi Media Card) Card, RS-MMC (Reduced Size-MultiMedia Card), MMCplus, MMC-mobile, DV (Dual Voltage) MMC cards, CE-ATA (Consumer Electronics-Advanced Technology Attachment) devices, SD (Secure Digital) Cards, DV (Dual Voltage) SD Cards, SDIO (SD Input/Output) cards, XD cards, Memory Stick, and other cards or devices including drives or any combination thereof.

The host 106 is typically configured to read and/or write to the card 102 and the bus is typically bidirectional. The host 106 represents, by way of example and not limitation, consumer devices such as personal digital assistants, digital cameras, personal audio players, digital media players, digital recorders, cellular telephones, laptop computers, and the like or any combination thereof.

The communication between the card 102 and the host 106 occurs over the contacts 110 that represent the pass through bus or connection between the card 102 and the host 106. The tap 104 is a device that enables the analyzer 114 to view the traffic occurring on the bus between the card 102 and the host 106 with minimal interference to the bus. The form factor of the tap 104 is often dependent on the form factor dictated by the host 106 and/or the corresponding card 102. In some embodiments, the tap 104 may be configured to accept multiple form factors and/or cards that may use different protocols.

The tap 104 is separate, in one embodiment, from the pod 112 for several reasons. Some protocols have connectors that have a low insertion cycle count as previously described and the ability to replace the tap 104 when the connectors fail is advantageous compared to replacing the entire pod 112. A detachable tap 104 also facilitates use of the analyzer 114 in size constrained areas and for some testing situations, such as vibration testing.

The data on the bus between the card 102 and the host 106 is received at a pod 112 from the tap 104. The pod 112 is adapted to connect with the analyzer 114 although embodiments of the invention contemplate a pod 112 that is integrated with the analyzer 114. Also, the pod 112 can be reprogrammed for use with different protocols in some instances. When the pod 112 is detachable, the removability of the pod 112 from the analyzer 114 permits the analyzer 114 to be adapted to multiple busses, network connections, etc, by selecting the appropriate pod and/or tap.

In some embodiments, the pod 112 may receive an ID signal from the tap 104 that indicates how the pod 112 should handle the signals being tapped. Similarly, the pod 112 may generate an ID signal that can be interpreted by the analyzer 114 such that the analyzer 114 knows which pod is attached, thereby identifying the appropriate protocols, and can run the appropriate analysis.

In one embodiment, a pod 112 can be used with multiple taps. For instance, the pod 112 may be used with an MMC/SD tap, a CE-ATA tap, or another tap. For a given tap or for a given protocol, the FPGA 113 can be programmed to prepare or decode the signals that are tapped according to the requirements of various protocols. For example, the FPGA 113 can be programmed to handle multiple protocols. In this case, the pod uses the tap ID to determine how to handle the data from the tap. Alternatively, the analyzer can use the tap ID and/or the pod ID to program the FPGA to handle or to decode the signals received from the bus. Typically, the actual programming of the FPGA is performed through an EEPROM, or through Select-Map pins through software or by any other method known to one of skill in the art of programming an FPGA.

For example, the specific protocol decoded by the pod is identified and selected based on the ID signal provided by the attached tap. Alternatively, the pod 112, after receiving the ID signal, can then be appropriately programmed by the analyzer 114. In this example, the pod 112 is typically configured for the SD, SDIO, MMC or CE-ATA protocols. The pod 112 can support state listing decoding, command listing decoding, timing waveform, pre-capture filtering, triggering, statistics including real time statistics, histogram, post-capture statistics and filtering, tree view of the captured data, and other protocol functions.

Figure 2:
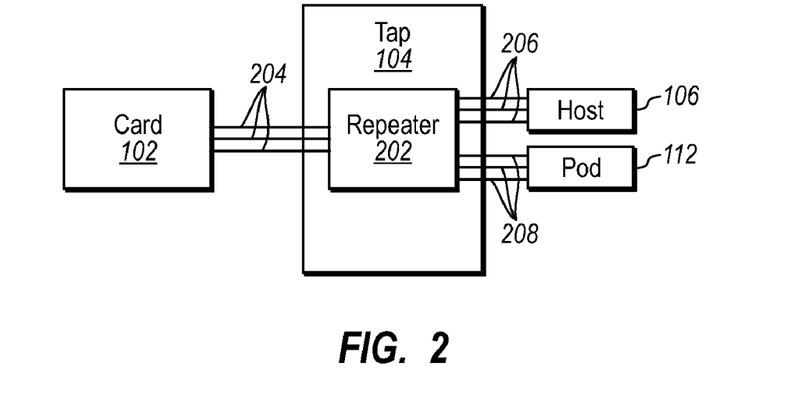
FIG. 2 illustrates one embodiment of a tap that interfaces with a bidirectional bus between a card and a host.

In one embodiment, the tap 104 is a pass-through tap in the sense that the digital signals are not retimed by the tap 104. Also, the bus may be a bi-directional bus. FIG. 2 illustrates an embodiment of the tap 104 that includes a repeater 202. The signals 204 from the card 102 are received by the repeater 202 and then passed through as the signals 206 to the host 106.

In one embodiment, the signals between the card 102 and the host 106 do not pass through the repeater. Rather, the tap 104 is configured such that the bus lines are tapped (using a via or the pins on the repeater chip for example) to branch off to the repeater 202. The traces, vias or pins that branch off to the repeater result in the signals 208 that are delivered to the pod 112. To minimize capacitive loading, the stubs created by branching off of the bus lines are kept as short as possible. In addition, there is no internal termination in the repeater 202 to maintain impedance matching.

Figure 3A:
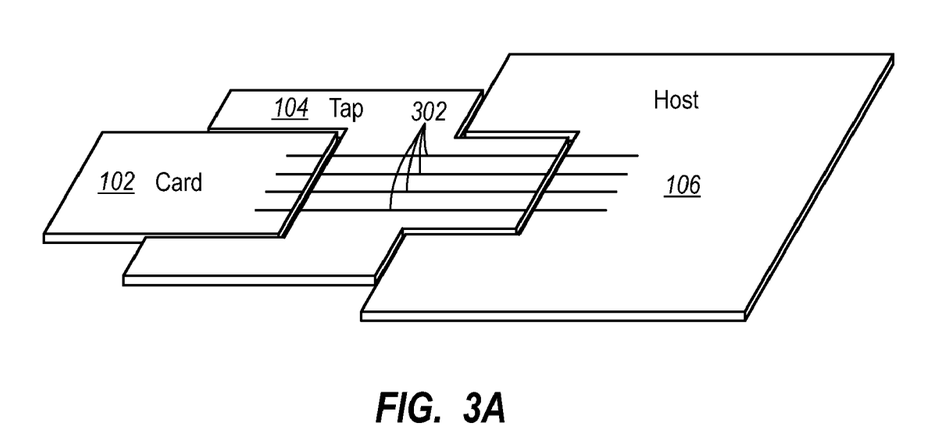
FIG. 3A illustrates an embodiment of a first side of a tap board illustrating connections between a device and a host.
Figure 3B:
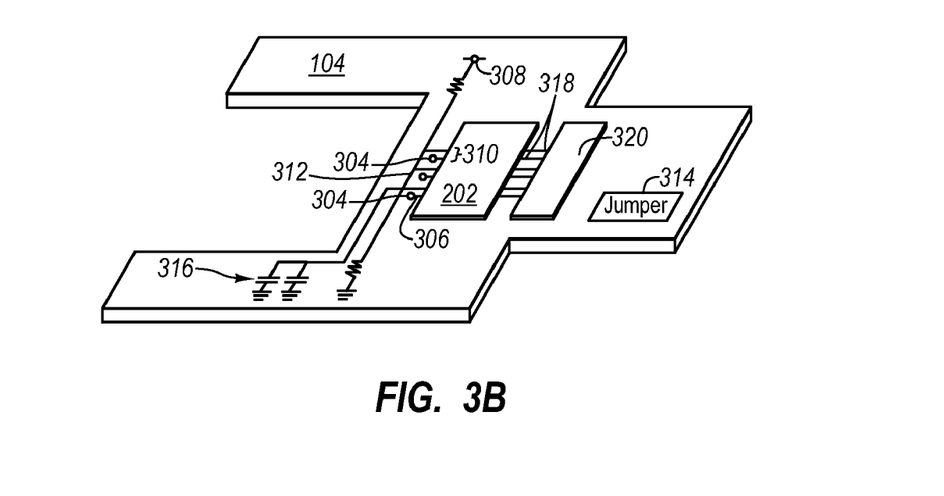
FIG. 3B illustrates an embodiment of a second side of a tap board that taps the bus shown in FIG. 3A and delivers the tapped signals to a pod.

FIGS. 3A and 3B illustrate opposite sides of an exemplary tap board. FIG. 3A illustrates the bus 302 that connects the card 102 with the host 106 and that the tap 104 provides a pass through bus 302 from the card 102 to the host 106. As shown in FIG. 3A, the bus 302, which includes multiple bus lines, is preferably as short as possible. The bus may also be bidirectional.

FIG. 3B illustrates the other side of the tap 104, The tap 104 includes a repeater 202 that connects to the bus 302 using the vias 304 in this example. One of skill in the art can appreciate that a tap may have multiple repeaters that are represented by the repeater 202. For instance, a repeater may be included for every four bus lines. Preferably, there is no internal termination in the repeater 202 and the stub 306 is kept as short as possible to minimize the impact of impedance mismatches on the transmission of data between the card 102 and the host 106.

The inputs to the repeater 202 are differential inputs in this example. One of the inputs to the differential input 310, for example, is a line from the bus. The line taps the bus through the corresponding via. The other input to the differential input 310 is a reference voltage from the circuit 312. In this example, the circuit 312 uses the voltage 308 (which is Vcc in one embodiment) from the host 106 as the reference voltage and then uses a voltage divider to generate the inputs to the repeater 202. A filter 316 may also be included in the circuit 312 in order to maintain a stable reference voltage. The voltage divider generates a reference voltage that can be used to determine whether the data or voltages on the bus 302 are high or low. Using the voltage provided by the host to generate the reference voltage enables the data on the bus 302 to be properly interpreted without knowing the operating voltage levels of the host 106 or the card 102. Further, the repeater 202 or other module or integrated circuit on the tap 104 may provide translation of the signals to a standard that is understood by the pod or by the analyzer. For example, the output of the repeater 202 may be LVDS signals.

In this example, the outputs of the repeater 202, represented by the output 318, are differential outputs, although embodiments of the invention also contemplate single ended outputs. The differential outputs 318 can be provided to a connector 320 that is used to connect the tap 104 with a pod 114 as described with reference to FIG. 1. A differential output ensures better signal quality over the length of any connecting cable between the tap 104 and the pod 112.

As previously indicated, the bus 302 may be a bidirectional bus. This is one reason for running the signals straight through from connector to connector as illustrated in FIG. 3A and for tapping the signals as illustrated in FIG. 3B. The repeater 202 preferably has a low input capacitance to ensure that the overall line capacitance does not exceed any specifications. Further, the repeater 202 preferably does not have any internal termination. This helps maintain any impedance matching that may be required by the bus 302.

In one embodiment, the circuit 312 may draw current from the host 106. The jumper 314 can be set such that the reference voltage is provided by the pod instead of from the host 106. Thus, the jumper 314 enables the selection of the interface or reference voltage that is derived from the host or the selection of an reference voltage that is supplied by the pod. When the reference voltage is received from the pod, it can also be user-configured. For example, the pod may include a DAC (Digital to Analog Converter) that generates the appropriate voltage level for the card. The reference voltage can be user controlled and can also be adjusted or fine tuned as needed. If the operating voltage of the system under test is unknown, the reference voltage can be adjusted until the tapped data makes sense.

Figure 3C:
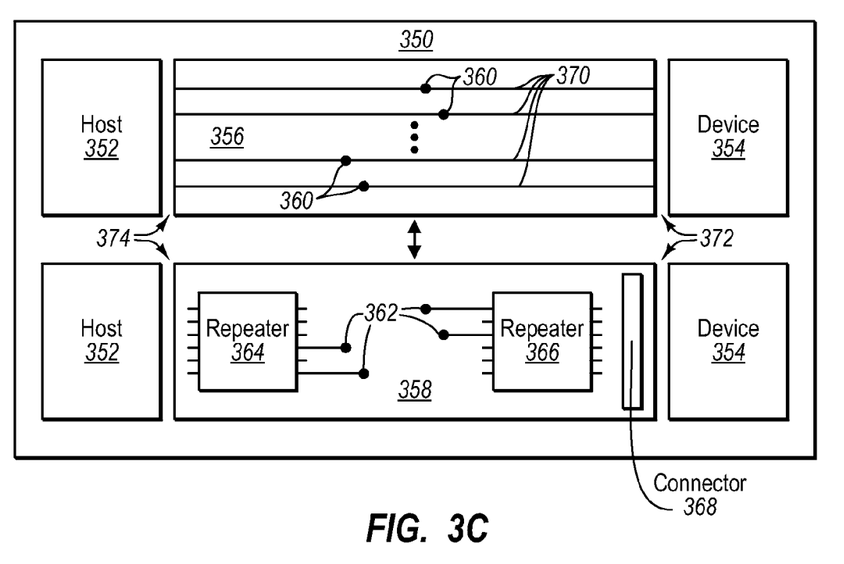
FIG. 3C illustrates another embodiment of a tap used in a system under test.
Figure 3D:
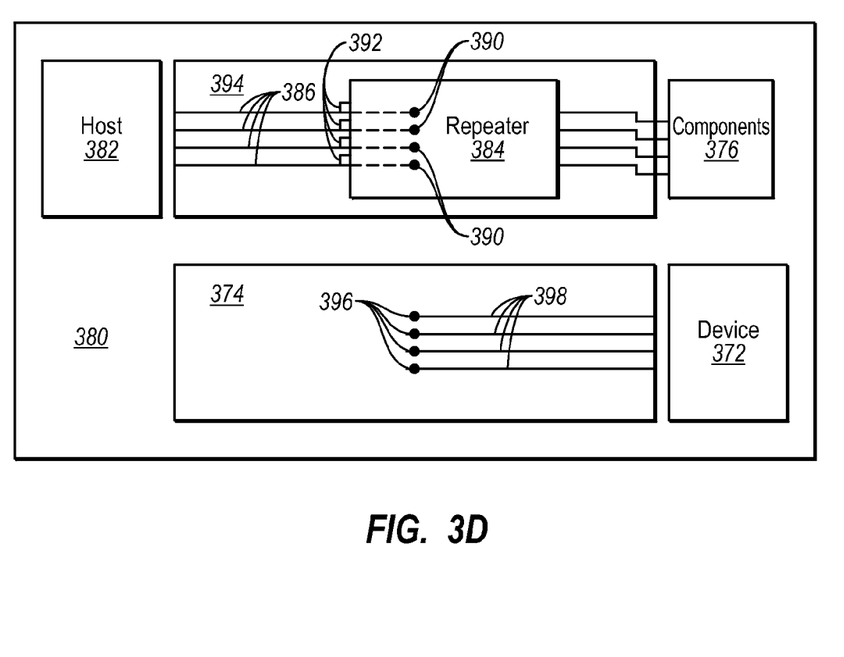
FIG. 3D illustrates another embodiment of a tap used in a system under test.

FIG. 3C and FIG. 3D illustrate additional embodiments of a tap as discussed herein. For clarity, some of the components or circuitry (such as the circuit 312) is not shown in FIGS. 3C and 3D. However, the embodiments illustrated in FIGS. 3C and 3D may also include similar circuitry or components.

FIG. 3C illustrates a tap used in a system under test 350 that includes a host 352 and a device 354 (such as a card). FIG. 3C illustrates a first side 356 and a second side 358 of a tap. On the side 356, a bus 370 is provided between the host 352 and the device 354. Providing a bus 370 in this manner minimizes the disruption to the communication between the host 352 and the device 354. The connection or interface 374 from the tap to the host 352 is on the same side 356 of the tap as the connection or interface 372 from the tap to the device 354.

In order to provide the data or the communications occurring over the bus 370 to an analyzer, vias 360 have been formed in some or all of the bus lines 370 on a first side 356 of the tap and appear on the other side 358 of the tap as the vias 362. The repeaters 364 and 366 can then connect to the bus 370 using traces or stubs from the vias 362. The trace or stub from each via 362 to a pin of a repeater 362 or 364 is often minimized. The side 358 of the tap also provides components 368 including a connector that can be used to connect the tap to a pod, for example. The components may also include a hard-coded tap ID, memory, interface voltage circuitry, and the like or any combination thereof. In this example, the circuitry needed to implement the tap can be formed on the side 358, which taps the bus 370 using vias.

FIG. 3D illustrates another embodiment of a tap used in a system under test 380 that includes a host 382 and a device 372. In this example, the bus 386 begins on a first side 394 of a tap. The pins 392 of the repeater 384 can be inserted directly into the bus lines 386 as needed. Advantageously, this minimizes stub length. The bus lines may continue to the vias 390, which lead to the other side 374 of the tap as vias 396. The bus lines 398 then continue on the device 372. In this example, the components 376 can be connected with the repeater 384. The components 376, may include, a connector to a pod, a memory, a hard-coded tap ID, and the like or as described herein.

Figure 4:
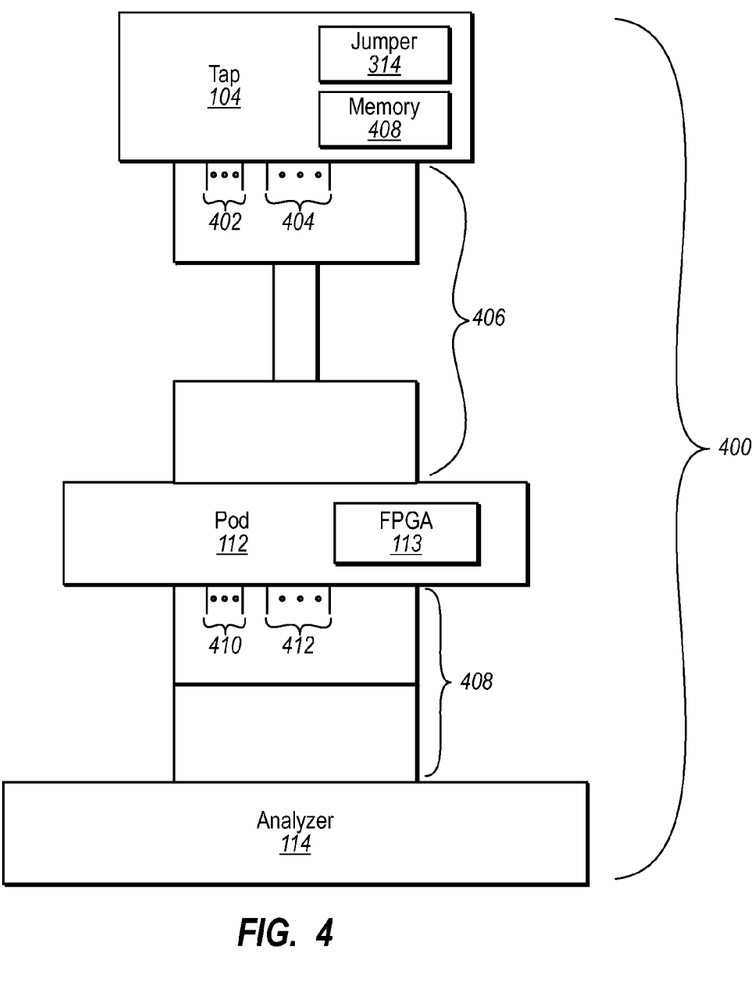
FIG. 4 illustrates interfaces in a system under test including an interface between a tap and a pod and an interface between a pod and an analyzer.

FIG. 4 illustrates the interfaces between the tap and the pod and between the pod and the analyzer. FIG. 4 further illustrates the ability of a single pod to be used with multiple taps. As described below, each tap can provide an ID to the pod. Using the tap ID, the pod can be select the appropriate way to handle any data received from the tap. In other words, the tap ID enables the pod to identify and understand what each of the bus lines represents and to process the signals accordingly. In some instances, the FPGA 113 of the tap 112 is loaded with the appropriate bitfile or appropriately programmed for the tap. Alternatively, the pod 112 can interact with the analyzer 114 to insure that the appropriate bitfile or programming is loaded into the pod 112 or more specifically into the FPGA 113 based on the tap ID. In a similar manner, the analyzer 114 can interact with the pod 112 based on a pod ID.

The interface 406 between the tap 104 and the pod 112 may be direct or may be via a cable as previously described. In one embodiment, the interface 406 includes a 50 pin connection, although one of skill in the art can appreciate that more or less pins can be used. The specific connections or pins are represented by the pins 402 and the pins 404. The pins 402 are used to provide a tap ID signal to the pod 112 and/or to the analyzer 114. The tap ID may be stored in memory 408 on the tap and can be accessed by the pod 112 and/or the analyzer 114. Alternatively, the tap ID can be hardwired into the tap.

The tap ID signal enables the pod 112 to interpret the signals that are present on the pins 404. In one example, the pins 404 represent multiple differential signals, power, ground, and a pod supplied voltage reference. The differential signals included in the pins 404 are generated by the repeater and each pair represents the current data on a line of the bus being tapped. The pod supplied voltage reference can be used if the jumper 314 is appropriately set. In an alternatively embodiment, circuitry can be included on the tap 104 such that the use of the host voltage or of the pod supplied voltage reference can be selected without having to manually set a jumper.

The interface 408 between the pod 112 and the analyzer 114 includes multiple channels that are connected or represented by the pins 410 and 412. The pins 410 are used, in one embodiment, to provide a pod ID to the analyzer 114. A pod ID enables the analyzer 114 to either program the pod 112 and the FPGA 113 appropriately as well as interpret the data that the analyzer 114 receives from the pod 112. The interface 408 is preferably an LVDS interface when the analyzer 114 requires LVDS signaling. As a result, the pod 112 may perform some signal translation if necessary. One of skill in the art can appreciate that other signaling schemes can be used at the interface 406 and/or the interface 408.

The pins 412 represent that channels over which data (including commands, programming, etc.) is communicated between the pod 112 and the analyzer 114. In some embodiments, the system 400 may not require use of all channels that exist at the interface 408. In this case, additional logic pods may be used on the extra channels. If any of the channels are unused, the FPGA 113 typically ties these signals to ground so they do not float.

In one embodiment, the interface between the pod and the analyzer can have multiple channels including single ended channels and/or differential channels. The pin count of the FPGA in the pod can be minimized by using a chip that may also perform signal translation. For example, a LVTTL signal generated by the FPGA may be translated to an LVDS signal that may be required by the analyzer.

A pod bitfile is used to process the signals present on the bus 302 and then deliver the processed or decoded data to the analyzer 114. The pod bitfile may be loaded by the analyzer 114 based on the pod ID and/or the tap ID. The pod bitfile enables the signals on the bus 302 to be defined such that the analyzer can perform, by way of example, providing a state listing, providing a command listing, providing a timing waveform, performing pre-capture filtering, performing post-capture filtering, performing triggering, providing real time statistics, providing a tree view, or providing a histogram or other analyzer functions.

In one embodiment, a state listing typically provides a command count that shows the byte count for MMC/SD command tokens, a command data column that shows the byte value for MMC/SD command tokens, a command description column that shows the decode of the MMC/SD command token, a response count column that shows the byte count for the MMC/SD response tokens, a response data column that shows the byte value for MMC/SD response tokens, a response description column that shows the decode of the MMC response token per specification, a data count column that shows the byte count for the data transferred on the data lines, a data column that shows the byte for the data transferred on the data lines, and a description column that shows the decode of the data transferred on the data lines. If the data is in response to an Identify Device Command and the decode option to decode the Identify Device Data is turned on, the description column will decode the Identify Device data as specified. If the data is the task file registers for ATA, the description column will show the register type and the read/write value. If the data is neither of the two, the description column will decode the data as ASCII.

In one embodiment, the command listing shows all of the Command and/or Response Tokens transferred on the MMC bus. If the command token is writing to or reading from the ATA task file register using a CMD60, the Command Listing will decode the task file registers and show the Command, LBA and other information like the ATA pod does in its Command Listing.

A histogram typically shows commands, data, and errors. In one embodiment, commands are often defined as the first byte of a Command and/or Response Token, data is defined as any data transferred on the data signals, and errors are defined as CRC errors and the error bit set when reading the status register.

Figure 5:
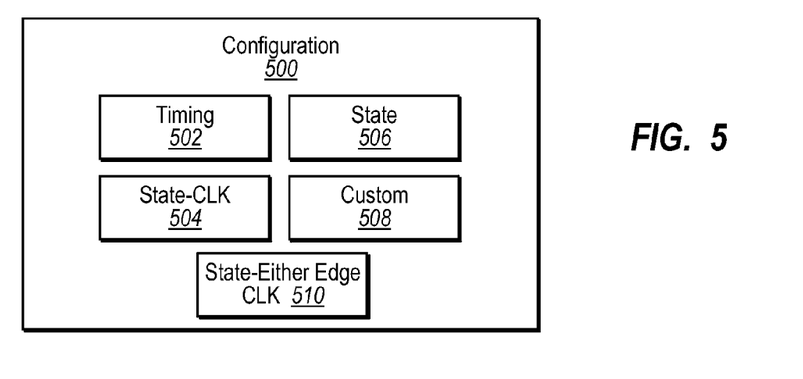
FIG. 5 illustrates a configuration menu that enables a user to configure the protocol analyzer or pod used to perform protocol analysis on consumer electronics.

The analyzer can be set up in various modes. FIG. 5 illustrates a configuration menu for the system 400 of FIG. 4. The configuration menu 500 includes a timing mode 502, a state mode 506, a state mode—rising edge clock mode 504, a state mode—either edge clock mode 510, and a custom capture mode 508. The timing mode 502 can be adjusted such that the analyzer only captures if there is a signal transition.

The state mode 506 enables a user to turn on/off the capture based on certain event types and in particular SD, SDIO, MMC or CE-ATA event types. Event types include, but are not limited to, Commands, Responses, CMD Idle, CE-ATA Command Completion Events, Power Off Events, Data Start Bit, SPI Data Start Tokens, Data, Data CRC, Data CRC Status, SPI Data Tokens, Data Idle, Device Busy, SDIO Interrupts and Unknown Data Events.

The state mode-rising edge clock mode 504 can cause the capture to occur on the rising edge of the clock signal. The state mode-either edge clock mode 510 can cause the capture to occur on the rising and/or falling edges of the clock signal. The custom capture mode 508 provides the ability to set custom capture events.

The pod 112 can have various triggers that can result in a capture of data from the bus 302. Exemplary triggers include, but are not limited to MMC Command/Response tokens, SD Command Response Tokens, MMC/SD Response Timeout, ATA Task File Register, Sector Count/Command, LBA/Command, Command/Status, Errors including but not limited to CRC Errors and Protocol Errors, Power Off Events, Protocol Reset, Lock Card Data and Custom Triggers or any combination thereof. The analyzer can also capture data in various modes that include, but are not limited to, stop when buffer full, loop until manual stop, and stop after trigger.

The system 400 illustrated in FIG. 4 and in particular the analyzer 114 further includes hardware search logic to find an event in addition to software based searches. One embodiment of hardware search logic is described in U.S. Pat. No. 6,226,789 and U.S. Pat. No. 6,393,587, which are incorporated by reference in their entirety.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A system for performing protocol analysis, the system comprising:
   a tap that interfaces with a system under test;
   a pod that interfaces with the tap through a detachable connection and that receives signals present on a bus of the system under test from the tap,
   wherein the pod is configured with a bitfile based on a tap ID received from the tap, and wherein the pod decodes the signals on the bus based on the bitfile;
   and an analyzer that detachably interfaces with the pod to perform protocol analysis on the data received from the pod, wherein the analyzer performs the protocol analysis on the data based on a pod ID received from the pod.

2. The system as defined in claim 1, wherein the tap includes memory for storing the tap ID such that the pod can read the tap ID from the memory of the tap.

3. The system as defined in claim 1, wherein the tap comprises a hard-coded tap ID such that the pod can read the tap ID.

4. The system as defined in claim 1, wherein the pod includes a pod interface to the tap, the pod interface including a first set of pins to receive at least the tap ID and a second set of pins to receive channels of data from the tap.

5. The system as defined in claim 1, wherein the pod further comprises an analyzer interface used to electrically connect with the analyzer.

6. The system as defined in claim 5, where the analyzer interface of the pod further comprises a first set of pins to provide a pod ID to the analyzer and a second set of pins to receive channels of data from the pod.

7. The system as defined in claim 1, wherein the tap is removably connected with the tap and wherein the pod is removably connected with the analyzer.

8. The system as defined in claim 1, wherein the bitfile is provided by the analyzer after the pod receives the tap ID.

9. The system as defined in claim 1, wherein the pod includes an FPGA that is pre-programmed with one or more bitfiles and a particular bitfile is used based on the tap ID.

10. The system as defined in claim 1, wherein the tap comprises: a repeater that receives signals from a bus that connects a host and a card of the system under test; and a circuit to provide a reference voltage to the repeater.

11. The system as defined in claim 10, wherein the repeater comprises a differential input for each line of the bus, wherein a first input of each differential input is from a tapped bus line and a second input of each differential input is the reference voltage.

12. A protocol analyzer for performing analysis on a system under test, the protocol analyzer comprising: a protocol analyzer having a pod interface;
    a pod that removably connects with the pod interface, the pod further having a tap interface, wherein the pod identifies itself to the protocol analyzer by providing a pod ID over the pod interface; and a tap that removably connects with the tap interface, the tap configured to connect with a system under test and provide a pass through bus between a card of the system under test and a host device of the system under test, wherein the analyzer identifies itself to the pod or the protocol analyzer over the tap interface, wherein the pod processes data received over the tap interface based on the tap ID and wherein the protocol analyzer processes data received over the pod interface based one or more of the tap ID or the pod ID.

13. The protocol analyzer as defined in claim 12, wherein the protocol analyzer programs a FPGA of the pod with a bitfile to permit the pod to process data received over the tap interface according to a protocol identified by the tap ID.

14. The protocol analyzer as defined in claim 13, wherein the bitfile permits signals tapped from the system under test to be defined such that the protocol analyzer can provide one or more of a state listing, a command listing, a timing waveform, pre-capture filtering, post-capture filtering, triggering, real time statistics, tree listing or a histogram.

15. The protocol analyzer as defined in claim 12, wherein the protocol analyzer receives user input to select a mode of operation.

16. The protocol analyzer as defined in claim 15, wherein the mode of operation includes one or more of a timing mode that enables capture if a signal transition is present, a state mode that enables a user to turn on/off certain event types including SD, SDIO, MMC or CE-ATA event types, a state mode that causes capture of data to occur on a rising edge of a clock signal, a state mode that causes capture of data to occur on a falling of a clock signal, or a state mode that causes capture of data to occur on a rising edge and falling edge of a clock signal.

17. The protocol analyzer as defined in claim 12, wherein the pod interface includes a first set of pins to provide the pod ID to the protocol analyzer and wherein the tap interface includes a second set of pins to provide the tap ID to the pod.

18. The protocol analyzer as defined in claim 12, wherein the tap further comprises one or more repeaters, each repeater having a differential input, wherein a first input to the differential input comprises a bus line and a second input to the differential input comprises a reference voltage from a circuit that is configured to generate the reference voltage based on a Vcc of the system under test or on a Vcc supplied by the pod.

19. The protocol analyzer as defined in claim 18, wherein the pass through bus provided by the tap is an electrical and bi directional connection between the host and the device.

20. The protocol analyzer as defined in claim 19, wherein each repeater connects to the pass through bus using a via and wherein a stub created connecting the one or more repeaters to the pass through bus has a length adapted to minimize an impact of impedance mismatches to the system under test.

21. The protocol analyzer as defined in claim 12, wherein the tap comprises a form factor compatible with one or more of an MMC card, a RS-MMC card, a MMCplus card, an MMCmobile, card, a DV MMC card, a CE-ATA device, an SD card, a DV SD card, an SDIO card, an XD card, a memory stick, or a hard drive.

22. The protocol analyzer as defined in claim 12, wherein the tap outputs LVDS signaling to the pod.

23. The protocol analyzer as defined in claim 12, wherein the system under test comprises one or more of a personal digital assistant, a digital camera, a personal audio player, a digital media player, a digital recorder, a cellular telephone, or a laptop computer.

* * * * *